(12) United States Patent
Park et al.

(10) Patent No.: US 9,493,154 B2
(45) Date of Patent: Nov. 15, 2016

(54) CONTROL APPARATUS AND METHOD OF POWER TRANSMISSION SYSTEM FOR HYBRID ELECRIC VEHICLE

(71) Applicant: Hyundai Motor Company, Seoul (KR)

(72) Inventors: Tae Sic Park, Busan (KR); Seongeun Park, Gyeonggi-do (KR); Jun Hoi Huh, Seoul (KR); Kwangmin Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/719,352

(22) Filed: May 22, 2015

(65) Prior Publication Data

US 2016/0107637 A1    Apr. 21, 2016

(30) Foreign Application Priority Data

Oct. 17, 2014  (KR) .......................... 10-2014-0141163

(51) Int. Cl.
*B60W 10/11* (2012.01)
*B60K 6/54* (2007.10)
(Continued)

(52) U.S. Cl.
CPC .............. *B60W 20/20* (2013.01); *B60K 6/365* (2013.01); *B60K 6/442* (2013.01); *B60K 6/547* (2013.01); *B60W 10/06* (2013.01); *B60W 10/115* (2013.01); *B60W 10/196* (2013.01); *B60W 20/106* (2013.01); *B60W 2510/0666* (2013.01); *B60W 2510/104* (2013.01); *B60W 2510/1005* (2013.01); *B60W 2510/244* (2013.01);
(Continued)

(58) Field of Classification Search
CPC ............. B60W 20/20; B60W 10/196; B60W 10/115; B60W 20/106; B60W 10/06; B60W 2510/0666; B60W 2510/1005; B60W 2710/0677; B60W 2710/244; B60W 2510/244; B60W 2710/10; B60K 6/365; B60K 6/442; B60K 6/547; Y10S 903/91; Y10S 903/919; Y10S 903/93; B60Y 2200/92
See application file for complete search history.

(56) References Cited

U.S. PATENT DOCUMENTS

2011/0022255 A1* 1/2011 Yamada ................... B60K 6/46
                                                          701/22
2014/0051545 A1* 2/2014 Berry ....................... B60K 6/48
                                                          477/3
(Continued)

FOREIGN PATENT DOCUMENTS

JP    2005-163912 A    6/2005
JP    2005-299844 A    10/2005
(Continued)

*Primary Examiner* — Rodney Butler
(74) *Attorney, Agent, or Firm* — Mintz Levin Cohn Ferris Glovsky and Popeo, P.C.; Peter F. Corless

(57) ABSTRACT

A control apparatus of a power transmission system is provided and includes an input shaft through which torque from an engine is input and first and second motor/generators. A planetary gear set is disposed on a line from the input shaft and an output shaft transmits torque from the planetary gear set and the second motor/generator to driving wheels. A battery supplies electricity to the first and second motor/generators and charges electricity generated therefrom. An HEV mode 1 in which an operation of a first brake and a second brake is released or an HEV mode 2 in which an operation of the second brake is operated is converted based on a mechanical maximum efficiency range, a required power of the engine, a speed ratio of a transmission, and an SOC of the battery.

15 Claims, 8 Drawing Sheets

(51) Int. Cl.
- *B60K 6/44* (2007.10)
- *B60K 6/36* (2007.10)
- *B60W 20/00* (2016.01)
- *B60W 10/196* (2012.01)
- *B60W 10/115* (2012.01)
- *B60W 10/06* (2006.01)
- *B60K 6/547* (2007.10)
- *B60K 6/442* (2007.10)
- *B60K 6/365* (2007.10)

(52) U.S. Cl.
CPC .. *B60W2710/0677* (2013.01); *B60W 2710/10* (2013.01); *B60W 2710/244* (2013.01); *B60Y 2200/92* (2013.01); *Y10S 903/91* (2013.01); *Y10S 903/919* (2013.01); *Y10S 903/93* (2013.01)

(56) References Cited

U.S. PATENT DOCUMENTS

2014/0343771 A1* 11/2014 Kim .................... B60W 10/02
                                                        701/22
2015/0039169 A1*  2/2015 Dextreit ............ B60W 50/0097
                                                        701/22

FOREIGN PATENT DOCUMENTS

| | | |
|---|---|---|
| JP | 3709083 B2 | 10/2005 |
| JP | 2010-111191 A | 5/2010 |
| JP | 2014-113902 A | 6/2014 |
| KR | 10-0360552 | 10/2002 |
| KR | 10-2007-0070305 A | 7/2007 |
| KR | 10-2013-0136779 A | 12/2013 |
| KR | 10-1459472 B1 | 11/2014 |

* cited by examiner

FIG. 2

| Mode | Brake 1 | Brake 2 | Explanation |
|---|---|---|---|
| EV mode 1 | | | EV mode implemented (MG2 driven) |
| EV mode 2 | ● | | EV mode implemented (MG1+MG2 driven) |
| HEV mode 1 | | | input driven type system structure |
| HEV mode 2 | | ● | high-speed fixed-stage gear implemented (OD) |

CONTROL APPARATUS AND METHOD OF POWER TRANSMISSION SYSTEM FOR HYBRID ELECRIC VEHICLE

CROSS-REFERENCE TO RELATED APPLICATION

This application claims priority to and the benefit of Korean Patent Application No. 10-2014-0141163 filed in the Korean Intellectual Property Office on Oct. 17, 2014, the entire contents of which are incorporated herein by reference.

BACKGROUND (a) Field of the Invention

The present invention relates to a control apparatus and method of a power transmission system. More particularly, the present invention relates to a control apparatus and method of a power transmission system that use power of an engine and a motor/generator with one planetary gear set and two friction members.

(b) Description of the Related Art

Environmentally-friendly technology for vehicles is a critical technology of the future vehicle industry, and advanced automobile manufacturers have been developed environmentally-friendly vehicles for satisfying environmental rules and improving fuel efficiency. Accordingly, automobile manufacturers have developed an electric vehicle (EV), a hybrid electric vehicle (HEV), and a fuel cell electric vehicle (FCEV) for the future vehicle technology.

There are various technical limitations of the future vehicles such as weight and cost, such that automobile manufacturers are interested in hybrid vehicles as an alternative plan of practical problems for satisfying regulations of exhaust gas and improving fuel efficiency. Hybrid vehicles are vehicles that use two or more energy sources (e.g., power sources) and may be implemented in various types, in which, generally, a gasoline engine or a diesel engine which generally uses a fossil fuel as the power source in the related art and a motor/generator driven by electrical energy are combined.

In particular, the hybrid vehicles use a motor/generator with relatively high low-speed torque characteristics as a main power source at a low speed, and use an engine with relatively high high-speed torque characteristics as the main power source at a high speed. Accordingly, the hybrid vehicles stop the engine using fossil fuel and use the motor generator in a low speed range, to advantageously improve fuel efficiency and reducing exhaust gas.

The power transmission systems of the hybrid vehicles are different in durability, power transmission efficiency, and size in accordance with connection configurations, such that research for achieving a compact power transmission system with a minimal loss of power has been conducted. Further, research regarding efficient control methods of the power transmission system has been conducted.

The above information disclosed in this section is merely for enhancement of understanding of the background of the invention and therefore it may contain information that does not form the prior art that is already known in this country to a person of ordinary skill in the art.

SUMMARY

The present invention provides a control apparatus and method of a power transmission system having advantages of being able to function as an electronic continuous variable transmission (E-CVT) to achieve traveling at an optimum operation point of an engine, using power from an engine and a motor/generator with one planetary gear set and two friction members.

A control apparatus of a power transmission system according to an exemplary embodiment of the present invention may include: an input shaft through which torque from an engine, which is a power source, may be input; first and second motor/generators that have functions of both a motor and a generator, as individual power sources; a planetary gear set disposed on a line from the input shaft and including a sun gear directly connected with the first motor/generator and selectively connected to a transmission housing, a planetary carrier directly connected with the input shaft and selectively connected to the transmission housing, and a ring gear configured to operate as an output element and connected with the second motor/generator; an output shaft configured to transmit torque from the planetary gear set and the second motor/generator to driving wheels through a differential; a first brake disposed between the planetary carrier and the transmission housing; a second brake disposed between the sun gear and the transmission housing; a battery configured to supply electricity to the first motor/generator and the second motor/generator and charge electricity generated from the first motor/generator and the second motor/generator; and a controller configured to convert an HEV mode 1 in which an operation of the first brake and the second brake is released or an HEV mode 2 in which an operation of the second brake is operated according to a mechanical maximum efficiency range, a required power of the engine, a speed ratio of a transmission, and a state of charge (SOC) of the battery.

The controller may be configured to convert an operation mode to the HEV mode 2 when the speed ratio is within the mechanical maximum efficiency range, and convert the operation mode to the HEV mode 1 when the speed ratio is beyond the mechanical maximum efficiency range. The controller may further be configured to maintain the operation mode as the HEV mode 2 when the SOC of the battery is within a normal range. In addition, the controller may be configured to convert the operation mode to the HEV mode 1 when the SOC of the battery is over-discharged and the required power is greater than an optimal operation power. The controller may further be configured to convert the operation mode to the HEV mode 1 when the SOC of the battery is overcharged and the required power is less than the optimal operation power.

The mechanical maximum efficiency range may be within a predetermined range from a mechanical maximum efficiency point defined by a speed ratio of the planetary gear set. The mechanical maximum efficiency point may be calculated from an equation of $$\frac{\frac{Z_r}{Z_s}}{1+\frac{Z_r}{Z_s}}$$

wherein $Z_r$ is a tooth number of the ring gear, and $Z_s$ is a tooth number of the sun gear.

A control method of a power transmission system according to another exemplary embodiment of the present invention may include: an input shaft through which torque from an engine, which is a power source, may be input; first and second motor/generators that have functions of both a motor and a generator, as individual power sources; a planetary gear set disposed on a line from the input shaft and including a sun gear directly connected with the first motor/generator and selectively connected to a transmission housing, a planetary carrier directly connected with the input shaft and selectively connected to the transmission housing, and a ring gear configured to operate as an output element and connected with the second motor/generator; an output shaft configured to transmit torque from the planetary gear set and the second motor/generator to driving wheels through a differential; a first brake disposed between the planetary carrier and the transmission housing; a second brake disposed between the sun gear and the transmission housing; a battery configured to supply electricity to the first motor/generator and the second motor/generator and charge electricity generated from the first motor/generator and the second motor/generator; and a controller configured to convert an HEV mode 1 in which an operation of the first brake and the second brake is released or an HEV mode 2 in which an operation of the second brake is operated.

Further, the controller may be configured to execute a series of commands that may include: determining a mechanical maximum efficiency range from a gear ratio of the planetary gear set; determining a required power of the engine from a vehicle speed and a required torque; determining a speed ratio from the required power and the vehicle speed; detecting an SOC of the battery; determining whether the speed ratio is within the mechanical maximum efficiency range; and converting an operation mode to the HEV mode 1 when the speed ratio is beyond the mechanical maximum efficiency range.

The control method of the power transmission system may further include: determining whether the SOC of the battery is within a normal range; and converting the operation mode to the HEV mode 2 when the SOC of the battery is within the normal range and the speed ratio is within the mechanical maximum efficiency range. In addition, the control method may include: determining whether the required power of the engine is greater than an optimal operation power when the SOC of the battery is overdischarged; and converting the operation mode to the HEV mode 1 when the required power of the engine is greater than the optimal operation power.

The control method of the power transmission system may further include: determining whether the required power of the engine is less than the optimal operation power when the SOC of the battery is overcharged; and converting the operation mode to the HEV mode 1 when the required power of the engine is less than the optimal operation power. The mechanical maximum efficiency range may be within a predetermined range from a mechanical maximum efficiency point defined by a speed ratio of the planetary gear set.

The mechanical maximum efficiency point may be calculated from an equation of $$\frac{\frac{Z_r}{Z_s}}{1+\frac{Z_r}{Z_s}}$$

wherein $Z_r$ is a tooth number of the ring gear, and $Z_s$ is a tooth number of the sun gear.

According to an exemplary embodiment of the present invention, it may be possible to establish a mode converting method of a hybrid vehicle according to an SOC of a battery and a driving condition of the vehicle. Further, it may be possible to reduce fuel consumption of a vehicle and improve driving performance by appropriately converting an operation mode based on the SOC of a battery and the driving condition of the vehicle.

BRIEF DESCRIPTION OF THE DRAWINGS

The accompanying drawings, which are included to provide a further understanding of the invention, illustrate exemplary embodiments of the invention, but exemplary embodiments of the present invention should not be construed as limited to the accompanying drawing.

FIG. 2 is an exemplary operation table for each operation mode of a friction member used in the power transmission system according to an exemplary embodiment of the present invention;

DETAILED DESCRIPTION

Figure 1:
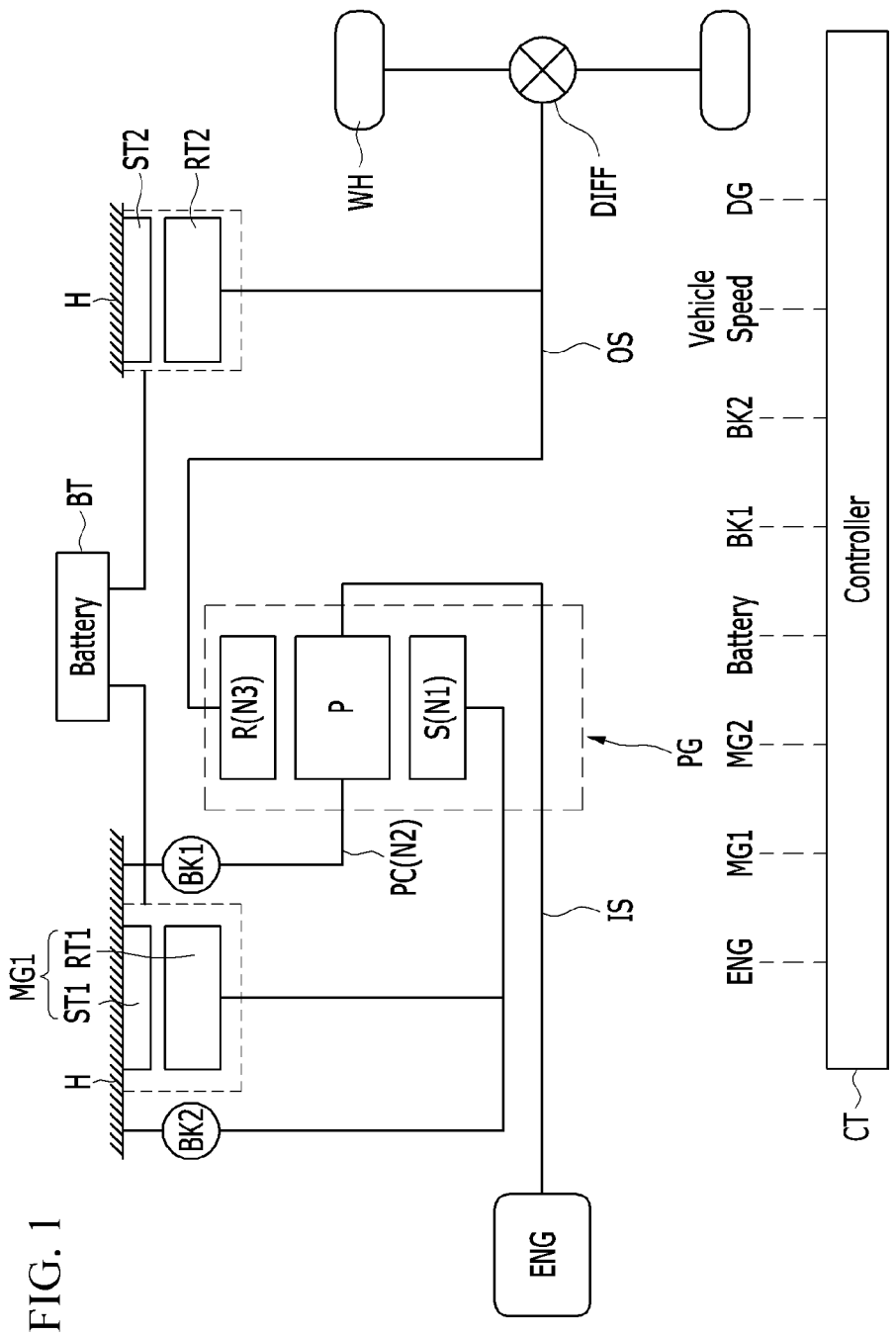
FIG. 1 is an exemplary schematic diagram illustrating a power transmission system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor.

The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Parts that are not related to the description of the exemplary embodiments are not shown to make the description clear, and like reference numerals designate like element throughout the specification. Further, the sizes and thicknesses of the configurations shown in the drawings are provided selectively for convenience of description such that the present invention is not limited to those shown in the drawings, and the thicknesses are exaggerated to make some parts and regions clearer.

Hereinafter, a power transmission system will be described in detail with reference to accompanying drawings.

FIG. 1 is an exemplary schematic diagram illustrating a power transmission system according to an exemplary embodiment of the present invention. As shown in FIG. 1, a power transmission system of a hybrid vehicle according to an exemplary embodiment of the present invention may be configured to shift power from an engine ENG and first and second motor/generators MG1 and MG2, which are power sources, in accordance with the traveling states of a vehicle, and output the power through an output shaft OS.

The power transmission system may include the engine ENG, the first motor/generator MG1, the second motor generator MG2, a planetary gear set PG, and two friction members BK1 and BK2. The engine is a power source in this configuration, and is a gasoline engine or a diesel engine using conventional fossil fuel. The first motor generator MG1 and the second motor/generator MG2, which are individual power sources, have the functions of both a motor and a generator.

The first motor/generator MG1 may include a first rotor RT1 and a first stator ST1, in which the first rotor RT1 may be directly connected with any one of the rotating elements of the planetary gear set PG and may be configured to operate as a start motor to start the engine, or as a generator to generate electricity while traveling by torque transmitted from the engine through the rotating element, and the first stator ST1 may be fixed to a transmission housing H. The second motor/generator MG2 may include a second rotor RT2 and a second stator ST2, in which the second rotor RT2 may be directly connected with an output shaft OS, and thus, the second motor/generator MG2 may be used as a main power source in an EV mode and as an auxiliary power source in an HEV mode, and the second stator ST2 may be fixed to the transmission housing.

In other words, the first and second motor/generators MG1 and MG2 may be configured to generate a driving torque in the EV mode in which the vehicle is driven by a motor in starting of a vehicle or low-speed and stop ranges, supplement the engine power in the HEV mode, and function as generators configured to convert reduction energy into electrical energy in decelerating or braking.

The output shaft OS may be connected with a differential DIFF, which is well known in the art, and the differential DIFF may be configured to drive driving wheels WH based on the input or differentially, in accordance with traveling conditions. The planetary gear set PG, a single pinion planetary gear set, may include a sun gear S (first rotating element), a planetary carrier PC (second rotating element) configured to rotatably support a pinion P externally engaged with the sun gear S, and a ring gear R (third rotating element) internally engaged with the pinion P.

The sun gear S1, a first rotating element N1, may be connected with the first rotor RT1 of the first generator MG1, and may be selectively connected with the transmission housing H. The planetary carrier PC, a second rotating element N2, may be directly connected with an input shaft IS to allow the torque from the engine ENG to be directly input, and may be selectively connected with the transmission housing H. The ring gear R, a third rotating element N3, may be directly connected with the output shaft OS and may operate as an output element.

The two friction members may be two brakes BK1 and BK2, in which the first brake BK1 may be disposed between the planetary carrier PC that is the second rotating element N2 and the transmission housing H such that the second rotating element N2 may operate as a selective fixing element. The second brake BK2 may be disposed between the sun gear S that is the first rotating element N1 and the transmission housing H such that the first rotating element N1 may operate as a selective fixing element. In this configuration, the friction members of the first and second brakes BK1 and BK2 are multi-plate hydraulic friction-coupling units that may be frictionally coupled by hydraulic pressure, or may be dry friction-coupling units.

FIG. 2 is an exemplary operation table for each operation mode of a friction member used in the power transmission system according to an exemplary embodiment of the present invention. Referring to FIG. 2, both of the first and second brakes BK1 and BK2 are not operated in the EV mode 1, the first brake BK1 operates in the EV mode 2, both of the first and second brakes BK1 and BK2 are not operated in the HEV mode 1, and the second brake BK2 operates in the HEV mode 2.

Figure 3:
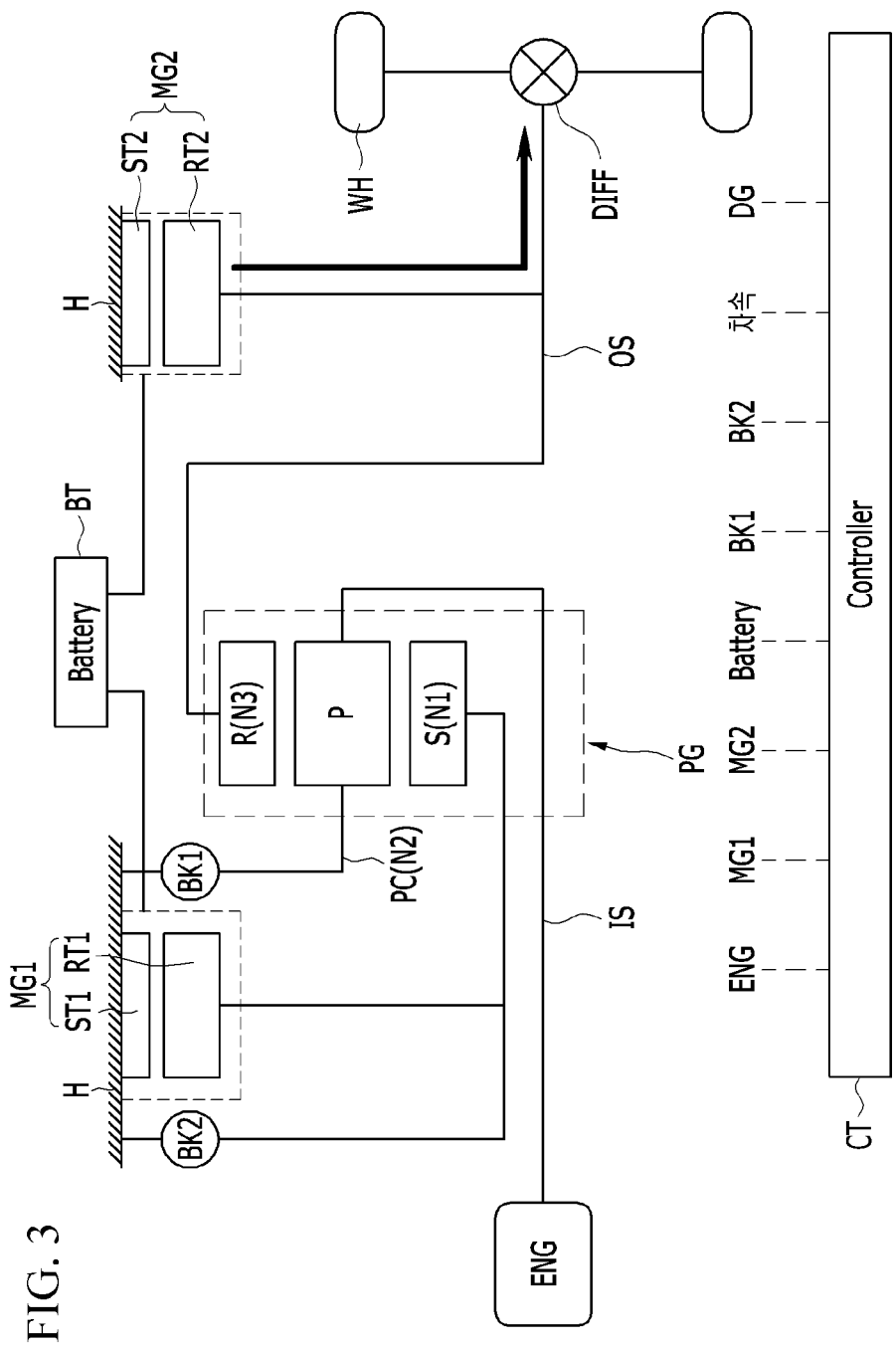
FIG. 3 is an exemplary diagram illustrating a power transmission path in an EV mode 1 and illustrating the configuration of the power transmission system according to an exemplary embodiment of the present invention.

FIG. 3 is an exemplary diagram illustrating a power transmission path in an EV mode 1 and illustrating the configuration of the power transmission system according to an exemplary embodiment of the present invention. Referring to FIG. 3, in the EV mode 1 in which a vehicle is driven by a motor during the starting of the vehicle or the low-speed and stop ranges, both of the first and second brakes BK1 and BK2 are not operated, as shown in FIG. 2.

Accordingly, the driving torque of the second motor/generator MG2 using the power of a battery B as an energy source may be transmitted to the driving wheels WH through the differential, to cause the vehicle to travel in the EV mode 1. In particular, the engine ENG may be stopped and the first motor/generator MG1 may be in non-load rotation with zero torque. To start the engine ENG in the EV mode 1, the first motor/generator MG1 may be configured to operate the engine ENG at an RPM at which the engine may be started, and then start the engine.

Figure 4:
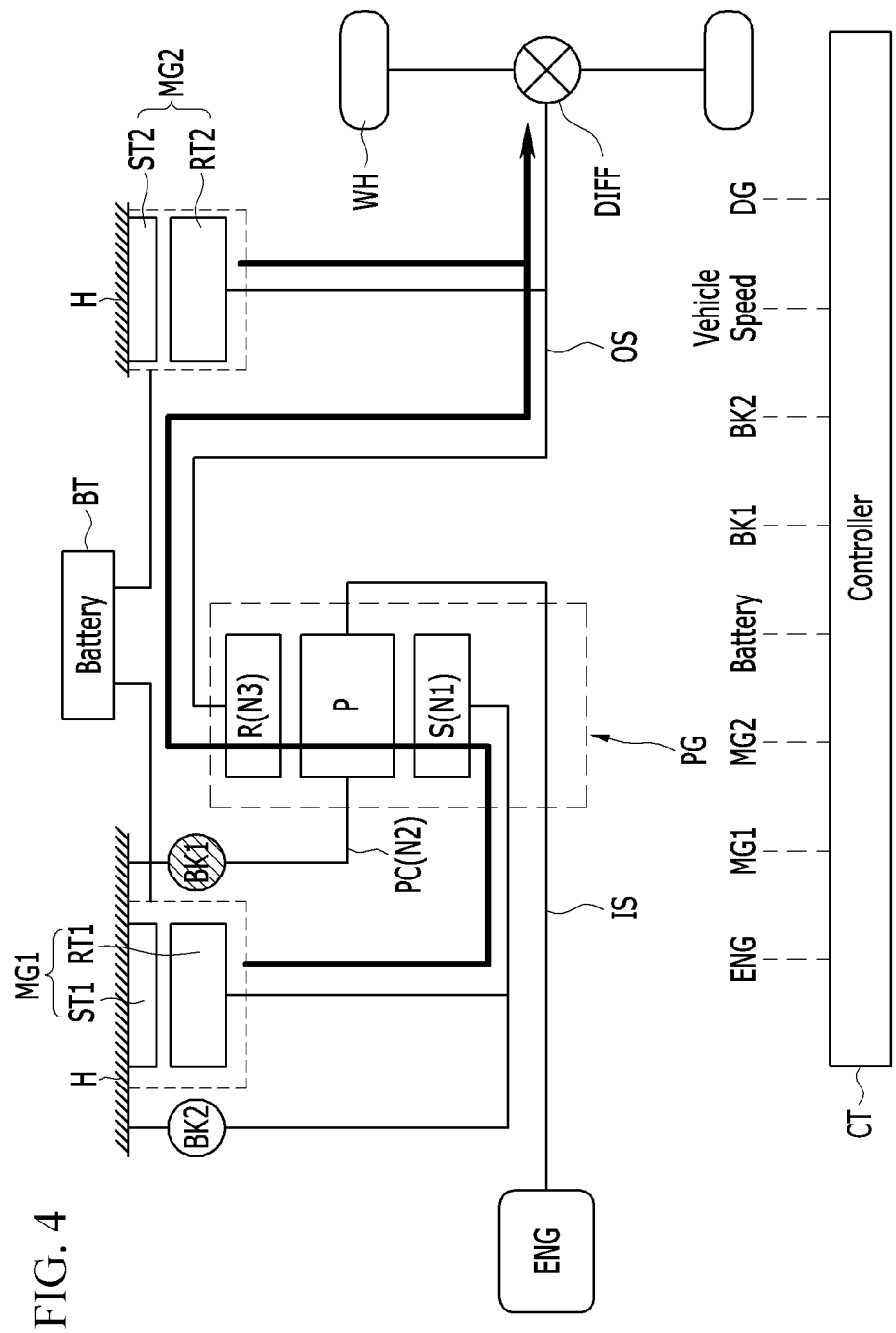
FIG. 4 is an exemplary diagram illustrating a power transmission path in an EV mode 2 and illustrating the configuration of the power transmission system according to an exemplary embodiment of the present invention.

FIG. 4 is an exemplary diagram illustrating a power transmission path in an EV mode 2 and illustrating the configuration of the power transmission system according to an exemplary embodiment of the present invention. Referring to FIG. 4, when an excessive load (e.g., a predetermined load) is applied to the second motor/generator MG2 due to the road conditions or the vehicle speed and torque is insufficient in the traveling state in the EV mode 1, the first brake BK1 may be operated to operate the vehicle to travel in the EV mode 2.

Accordingly, both of the first and second motor/generators MG1 and MG2 may be used as power sources, and when turning off the EV mode 2, it may be possible to minimize shock due to mode conversion by stopping the first brake BK1 after concentrating the torque, which is distributed to the first motor/generator MG1 and the second generator MG2, on the second generator MG2.

Figure 5:
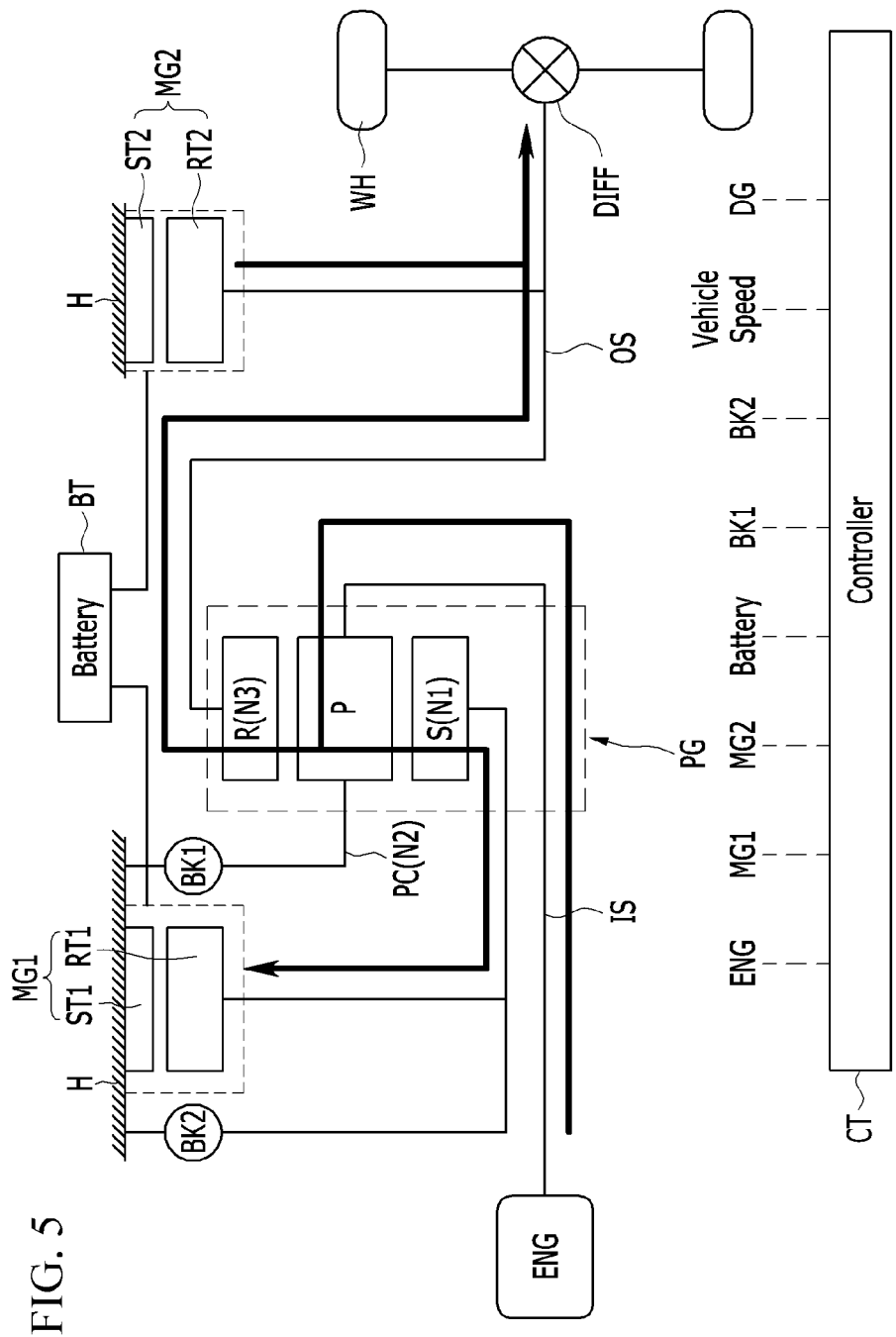
FIG. 5 is an exemplary diagram illustrating a power transmission path in an HEV mode 1 and illustrating the configuration of the power transmission system according to an exemplary embodiment of the present invention.

FIG. 5 is an exemplary diagram illustrating a power transmission path in an HEV mode 1 and illustrating the configuration of the power transmission system according to an exemplary embodiment of the present invention. Referring to FIG. 5, the HEV mode 1 may be implemented after the engine ENG is started, in which the first motor/generator MG1 and the second motor generator MG2 operate as a generator and a motor, respectively, and may be operated to be driven at the optimum operation point of the electronic continuous variable transmission (E-CVT), that is, the engine ENG. In particular, the second motor/generator MG2 may be configured to supplement the power of the engine ENG usually as a motor, since it may be directly connected with output.

Figure 6:
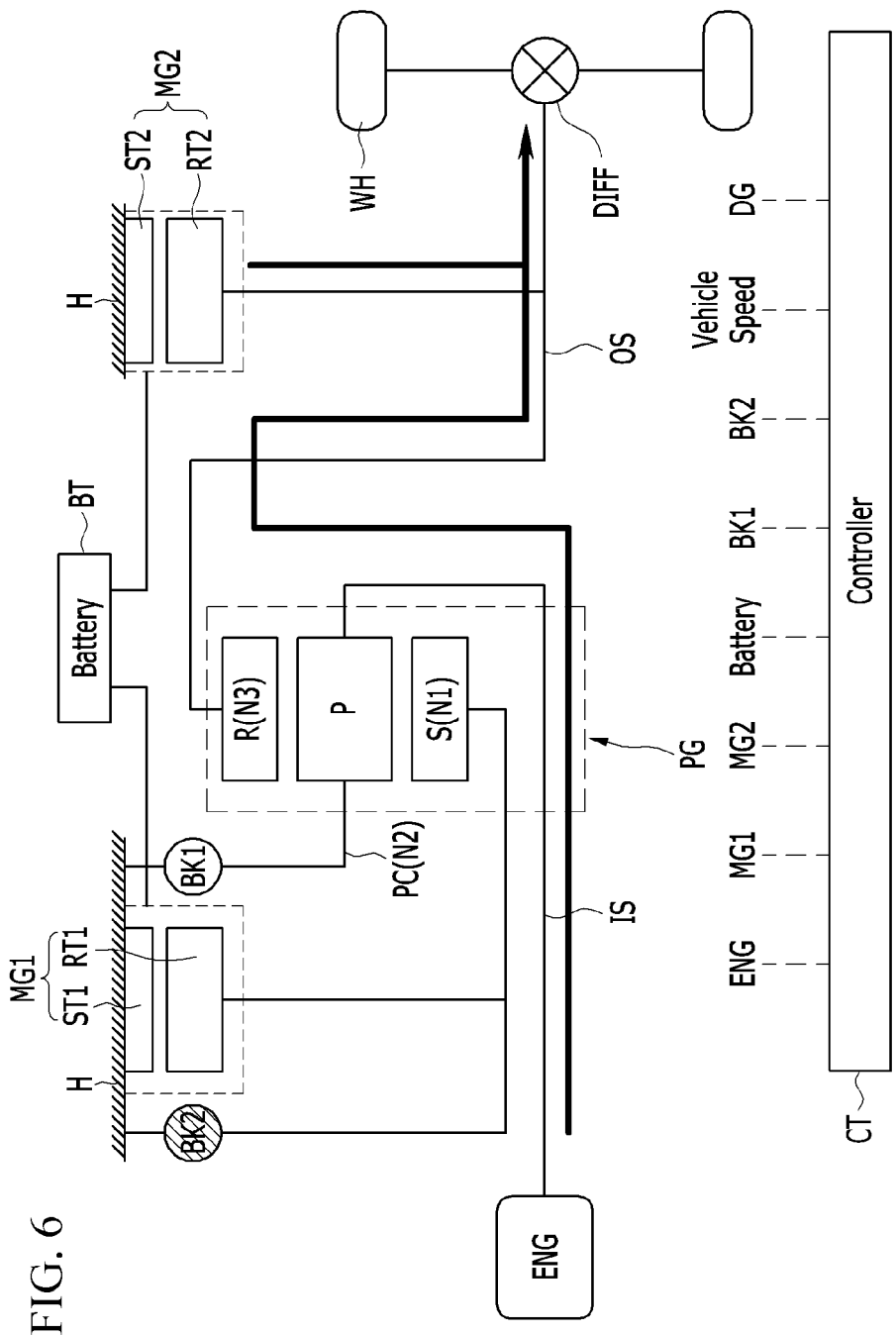
FIG. 6 is an exemplary diagram illustrating a power transmission path in an HEV mode 2 and illustrating the configuration of the power transmission system according to an exemplary embodiment of the present invention.

FIG. 6 is an exemplary diagram illustrating a power transmission path in an HEV mode 2 and illustrating the configuration of the power transmission system according to an exemplary embodiment of the present invention. Referring to FIG. 6, when the speed of the first motor/generator MG1 is adjusted to be about 0 rpm or less due to high-speed traveling in the HEV mode 1, the second brake BK2 may be configured to operate and the mode may change into the HEV mode 2 to minimize a loss of energy due to the driving of the first motor/generator MG1. In particular, the engine ENG may be directly driven without the first motor/generator MG1 being operated, and the second motor/generator MG2 may be configured to execute charging and discharging torque for efficient operation of the engine ENG.

As described above, the power transmission apparatus according to an exemplary embodiment may be configured to use the power from the engine ENG and two motor/generators MG1 and MG2 with one planetary gear set PG and two brakes BK1 and BK2, implement traveling at the optimum operation point of the engine ENG, and may function as an electronic continuous variable transmission (E-CVT). Further, by using two motor/generators in the EV mode traveling with two brakes BK1 and BK2, it may be possible to increase the traveling speed in the EV mode and to drive with a fixed-stage gear implemented in the HEV mode 2 in high-speed traveling, to cope with a PHEV and increase the effect of improving upward-driving ability and fuel efficiency.

Hereinafter, a control apparatus of a power transmission system for a hybrid vehicle will be described in detail with reference to accompanying drawings. As shown in FIG. 1 to FIG. 6, a control apparatus of a power transmission system according to an exemplary embodiment of the present invention may include the engine ENG, the friction members, the first motor/generator MG1, the second motor/generator MG2, and a controller CT configured to operate the above elements. The controller CT may be configured as at least one processor operated according to a predetermined program that is configured to perform each step of the control method of the power transmission system according to an exemplary embodiment of the present invention.

In particular, the controller CT may be configured to convert an operation mode to an HEV mode 1 or an HEV mode 2 based on a mechanical maximum efficiency range, a required power of the engine, a speed ratio of a transmission, and an SOC of the battery. The HEV mode 1 may be a mode in which an operation of the first brake BK1 and the second brake BK2 is released, and the HEV mode 2 may be a mode in which the second brake BK2 is operated. The controller CT may further be configured to convert the HEV mode 1 to the HEV mode 2 and vice versa by comparing a mechanical maximum efficiency range to a speed ratio. In other words, the controller CT may be configured to convert the operation mode to the HEV mode 2 when the speed ratio is within the mechanical maximum efficiency range. The controller CT may also be configured to convert the operation mode to the HEV mode 1 when the speed ratio is beyond the mechanical maximum efficiency range.

The speed ratio may be determined by an SOC of the battery BT, a required torque of the vehicle, a required power of the engine ENG determined from a vehicle speed, and an optimal rotation speed of the engine ENG based on the required power of the engine ENG. The required power may be stored within the controller CT as map data. The mechanical maximum efficiency range may be within a predetermined range from a mechanical maximum efficiency point (in other words, 'mechanical point') defined by a speed ratio of the planetary gear set PG. The mechanical maximum efficiency point may be the speed ratio to reach target engine ENG rotation speed without electrically operating the motor/generator.

In other words, RPM of the first motor/generator MG1 may become about zero and torque of the second motor/generator MG2 may become about zero when the speed ratio reaches the mechanical maximum efficiency point. Therefore, it may be possible to reach target engine ENG rotation speed without electrically operating the motor/generator. The mechanical maximum efficiency point may be calculated from the following equation.

$$\frac{\frac{Z_r}{Z_s}}{1+\frac{Z_r}{Z_s}} \quad \text{Equation 1}$$

wherein, Zr is a tooth number of the ring gear and Zs is a tooth number of the sun gear. The mechanical maximum efficiency range may be within a range from the mechanical maximum efficiency point.

Figure 7:
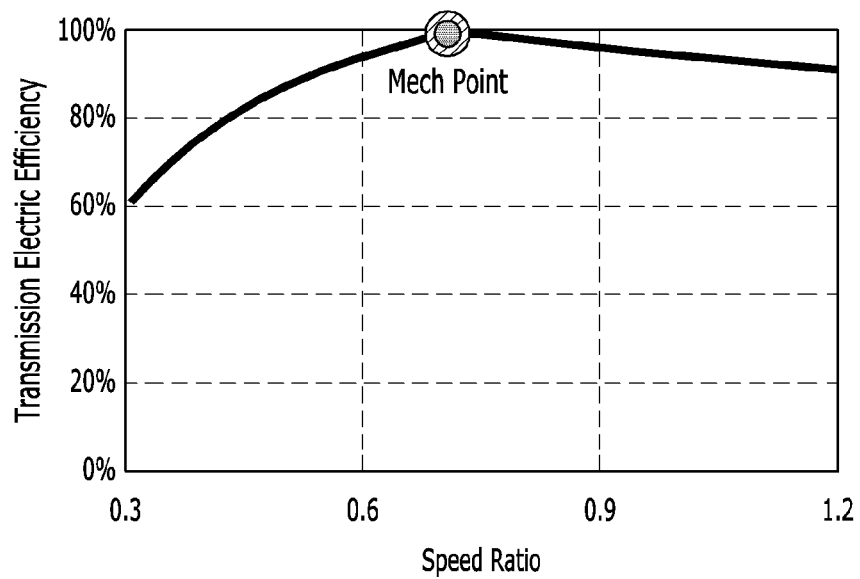
FIG. 7 is an exemplary graph illustrating a relationship between a speed ratio and electrical efficiency of a power transmission system.

FIG. 7 is an exemplary graph illustrating a relationship between a speed ratio and electrical efficiency of a power transmission system. As shown in FIG. 7, when the speed ratio is less than the mechanical maximum efficiency point, electrical efficiency may be rapidly deteriorated. Therefore, when the speed ratio is less than the mechanical maximum efficiency point, the operation mode is to be converted to the HEV mode 2 and it may be possible to improve the electrical efficiency of the power transmission system. Further, since the mechanical maximum efficiency range is clearly defined, it may be possible to prevent frequent conversion between the HEV mode 1 and the HEV mode 2.

The controller CT may be configured to convert the operation mode of the vehicle to the HEV mode 2 when the speed ratio is within the mechanical maximum efficiency range. Additionally, the controller CT may be configured to the operation mode of the vehicle to the HEV mode 1 when the speed ratio is beyond (e.g., is greater than) the mechanical maximum efficiency range. Meanwhile, the controller CT may be configured to detect the SOC of the battery BT when the speed ratio is within the mechanical maximum efficiency range. When the SOC of the battery BT is within a normal range (e.g., is no beyond the range), the controller CT may be configured to maintain the operation mode as the HEV mode 2.

Additionally, the controller CT may be configured to whether the operation mode is converted to the HEV mode 2 by comparing the required power of the engine ENG to an optimal operation power when the SOC of the battery BT is beyond the normal range. The optimal operation power may be determined from a rotation speed of the engine ENG and engine ENG torque. The required power and the optimal operation power may be stored in the controller as a map data. In particular, when the SOC of the battery BT is over-discharged, the controller CT may be configured to compare the required power of the engine ENG to the optimal operation power. When the required power of the engine ENG is greater than the optimal operation power, the HEV mode 2 may be released and the operation mode may be converted to the HEV mode 1. When the SOC of the battery BT is overcharged, the controller CT may be configured to compare the required power of the engine ENG to the optimal operation power. When the required power of the engine ENG is less than the optimal operation power, the HEV mode 2 may be released and the operation mode may be converted to the HEV mode 1.

As described above, the operation mode may be converted into the HEV mode 1 and the HEV mode 2 according to the driving condition of the vehicle, such that fuel consumption of the vehicle is reduced. Hereinafter, a control method of the power transmission system according to an exemplary embodiment of the present invention will be described in detail with reference to accompanying drawings.

Figure 8:
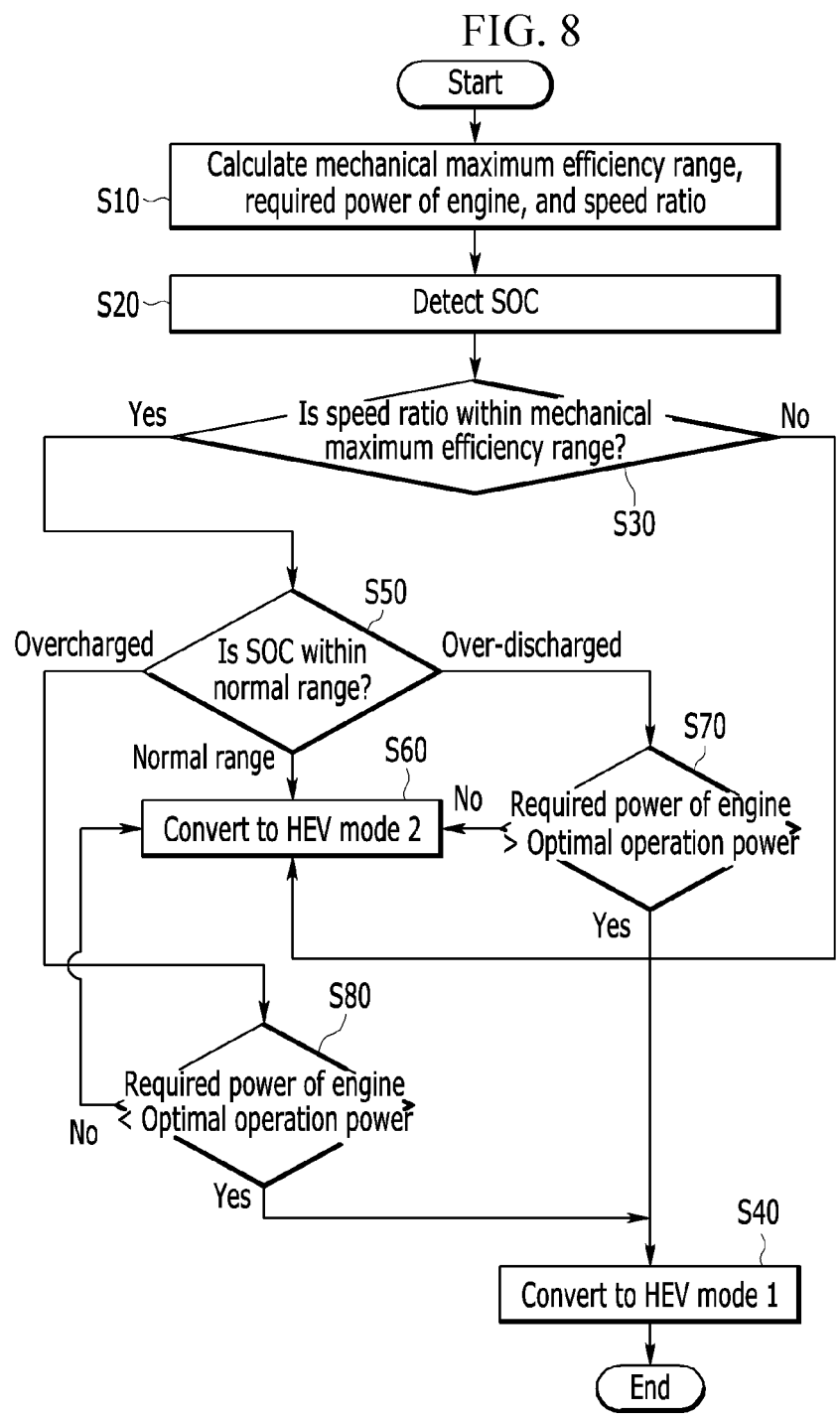
FIG. 8 is an exemplary flowchart illustrating a control method of a power transmission system according to an exemplary embodiment of the present invention.

FIG. 8 is an exemplary flowchart illustrating a control method of a power transmission system according to an exemplary embodiment of the present invention. As shown in FIG. 8, the controller CT may be configured to calculate the mechanical maximum efficiency range, the required power of the engine ENG, and the speed ratio at step S10. As described above, the mechanical maximum efficiency point may be determined from the gear ratio of the planetary gear set PG, and the mechanical maximum efficiency range may be determined within the predetermined range from the mechanical maximum efficiency point.

The required power of the engine ENG may be determined from the SOC of the battery BT, the required torque of the vehicle, and the vehicle speed. The optimal rotation speed of the engine ENG may be determined based on the required power of the engine ENG. The speed ratio may be determined from the optimal rotation speed of the engine ENG and the required power of the engine ENG. The controller CT may be configured to detect the SOC of the battery BT at step S20. The controller CT may also be configured to determine whether the speed ratio is within the mechanical maximum efficiency range at step S30.

When the speed ratio is beyond the mechanical maximum efficiency point range, the controller CT may be configured to convert the operation mode to HEV mode 2. When the speed ratio is within the mechanical maximum efficiency range, the controller CT may be configured to determine whether the SOC of the battery BT is within the normal range at step S50. When the SOC of the battery BT is within the normal range, the controller CT may be configured to convert the operation mode to the HEV mode 2 at step S60. When the SOC of the battery BT is over-discharged, the controller CT may be configured to determine whether the required power of the engine ENG is greater than the optimal operation power at step S70. When the required power of the engine ENG is greater than the optimal operation power, the controller CT may be configured to convert the operation mode to the HEV mode 1 at step S40.

Further, when the required power of the engine ENG is less than the optimal operation power, the controller CT may be configured to convert the operation mode to the HEV mode 2 at step S60. When the SOC of the battery BT is overcharged at step S50, the controller CT may be configured to determine whether the required power of the engine ENG is less than the optimal operation power at step S80. When the required power of the engine ENG is less than the optimal operation power, the controller CT may be configured to convert the operation mode the HEV mode 1 at step S40. When the required power of the engine ENG is greater than the optimal operation power at step S80, the controller CT may be configured to convert the operation mode to the HEV mode 2 S60.

DESCRIPTION OF SYMBOLS

ENG: engine
BK1: first brake
BK2: second brake
CL: clutch
DIFF: differential
MG1: first motor/generator
MG2: second motor/generator
PG: planetary gear set
BT: battery
CT: controller While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A control apparatus of a power transmission system, comprising:
an input shaft through which torque from an engine is input;
first and second motor/generators configured to operate as both a motor and a generator;
a planetary gear set disposed on a line from the input shaft and including a sun gear directly connected with the first motor/generator and selectively connected to a transmission housing, a planetary carrier directly connected with the input shaft and selectively connected to the transmission housing, and a ring gear configured to operate as an output element and connected with the second motor/generator;
an output shaft configured to transmit torque from the planetary gear set and the second motor/generator to driving wheels through a differential;
a first brake disposed between the planetary carrier and the transmission housing;
a second brake disposed between the sun gear and the transmission housing;
a battery configured to supply electricity to the first motor/generator and the second motor/generator and charge electricity generated from the first motor/generator and the second motor/generator; and
a controller configured to convert a hybrid electric vehicle (HEV) mode 1 in which an operation of the first brake and the second brake is released or an HEV mode 2 in which an operation of the second brake is operated according to a mechanical maximum efficiency range, a required power of the engine, a speed ratio of a transmission, and a state of charge (SOC) of the battery.

2. The control apparatus of the power transmission system of claim 1, wherein the controller is configured to convert an operation mode to the HEV mode 2 when the speed ratio is within the mechanical maximum efficiency range, and convert the operation mode to the HEV mode 1 when the speed ratio is beyond the mechanical maximum efficiency range.

3. The control apparatus of the power transmission system of claim 2, wherein the controller is configured to maintain the operation mode as the HEV mode 2 when the SOC of the battery is within a normal range.

4. The control apparatus of the power transmission system of claim 2, wherein the controller is configured to convert the operation mode to the HEV mode 1 when the SOC of the battery is over-discharged and the required power is greater than an optimal operation power.

5. The control apparatus of the power transmission system of claim 2, wherein the controller is configured to convert the operation mode to the HEV mode 1 when the SOC of the battery is overcharged and the required power is less than the optimal operation power.

6. The control apparatus of the power transmission system of claim 1, wherein the mechanical maximum efficiency range is within a predetermined range from a mechanical maximum efficiency point defined by a speed ratio of the planetary gear set.

7. The control apparatus of the power transmission system of claim 6, wherein the mechanical maximum efficiency point is calculated from an equation of $$\frac{\frac{Z_r}{Z_s}}{1+\frac{Z_r}{Z_s}},$$

wherein $Z_r$ is a tooth number of the ring gear, and $Z_s$ is a tooth number of the sun gear.

8. A control method of a power transmission system, comprising:
determining a mechanical maximum efficiency range from a gear ratio of a planetary gear set disposed on a line from an input shaft and including a sun gear directly connected with a first motor/generator and selectively connected to a transmission housing, a planetary carrier directly connected with the input shaft and selectively connected to the transmission housing, and a ring gear operating as an output element and connected with a second motor/generator;
determining a required power of an engine from a vehicle speed and a required torque;
determining a speed ratio from the required power and the vehicle speed;
detecting a state of charge (SOC) of a battery that supplies electricity to the first motor/generator and the second motor/generator and charges electricity generated from the first motor/generator and the second motor/generator;
determining whether the speed ratio is within the mechanical maximum efficiency range; and
converting an operation mode to a hybrid electric vehicle (HEV) mode 1 in which an operation of a first brake and second brake is released when the speed ratio is beyond the mechanical maximum efficiency range,
wherein the first brake is disposed between the planetary carrier and the transmission housing and the second brake disposed between the sun gear and the transmission housing.

9. The control method of the power transmission system of claim 8, further comprising:
determining whether the SOC of the battery is within a normal range; and
converting the operation mode to HEV mode 2 in which an operation of the second brake is operated when the SOC of the battery is within the normal range and the speed ratio is within the mechanical maximum efficiency range.

10. The control method of the power transmission system of claim 9, further comprising:
determining whether the required power of the engine is greater than an optimal operation power when the SOC of the battery is over-discharged; and
converting the operation mode to the HEV mode 1 when the required power of the engine is greater than the optimal operation power.

11. The control method of the power transmission system of claim 9, further comprising:
determining whether the required power of the engine is less than the optimal operation power when the SOC of the battery is overcharged; and
converting the operation mode to the HEV mode 1 when the required power of the engine is less than the optimal operation power.

12. The control method of the power transmission system of claim 8, wherein the mechanical maximum efficiency range is within a predetermined range from a mechanical maximum efficiency point defined by a speed ratio of the planetary gear set.

13. The control method of the power transmission system of claim 12, wherein the mechanical maximum efficiency point is calculated from an equation of $$\frac{\frac{Z_r}{Z_s}}{1+\frac{Z_r}{Z_s}},$$

wherein Zr is a tooth number of the ring gear, and Zs is a tooth number of the sun gear.

14. A non-transitory computer readable medium containing program instructions executed by a controller, the computer readable medium comprising:
    program instructions that determine a mechanical maximum efficiency range from a gear ratio of a planetary gear set disposed on a line from an input shaft through which torque from an engine is input and including a sun gear directly connected with a first motor/generator and selectively connected to a transmission housing, a planetary carrier directly connected with the input shaft and selectively connected to a transmission housing, and a ring gear operating as an output element and connected with a second motor/generator;
    program instructions that determine a required power of the engine from a vehicle speed and a required torque;
    program instructions that determine a speed ratio from the required power and the vehicle speed;
    program instructions that detect a state of charge (SOC) of a battery configured to supply electricity to the first motor/generator and the second motor/generator and charge electricity generated from the first motor/generator and the second motor/generator;
    program instructions that determine whether the speed ratio is within the mechanical maximum efficiency range;
    program instructions that convert a hybrid electric vehicle (HEV) mode 1 in which an operation of the first brake and the second brake is released or an HEV mode 2 in which an operation of the second brake is operated; and
    program instructions that convert an operation mode to the HEV mode 1 when the speed ratio is beyond the mechanical maximum efficiency range.

15. The non-transitory computer readable medium of claim 14, further comprising:
    program instructions that determine whether the SOC of the battery is within a normal range; and
    program instructions that convert the operation mode to the HEV mode 2 when the SOC of the battery is within the normal range and the speed ratio is within the mechanical maximum efficiency range.

* * * * *